Feb. 22, 1955     O. FISCHER     2,702,575
FLEXIBLE SKID CHAIN
Filed Feb. 15, 1952
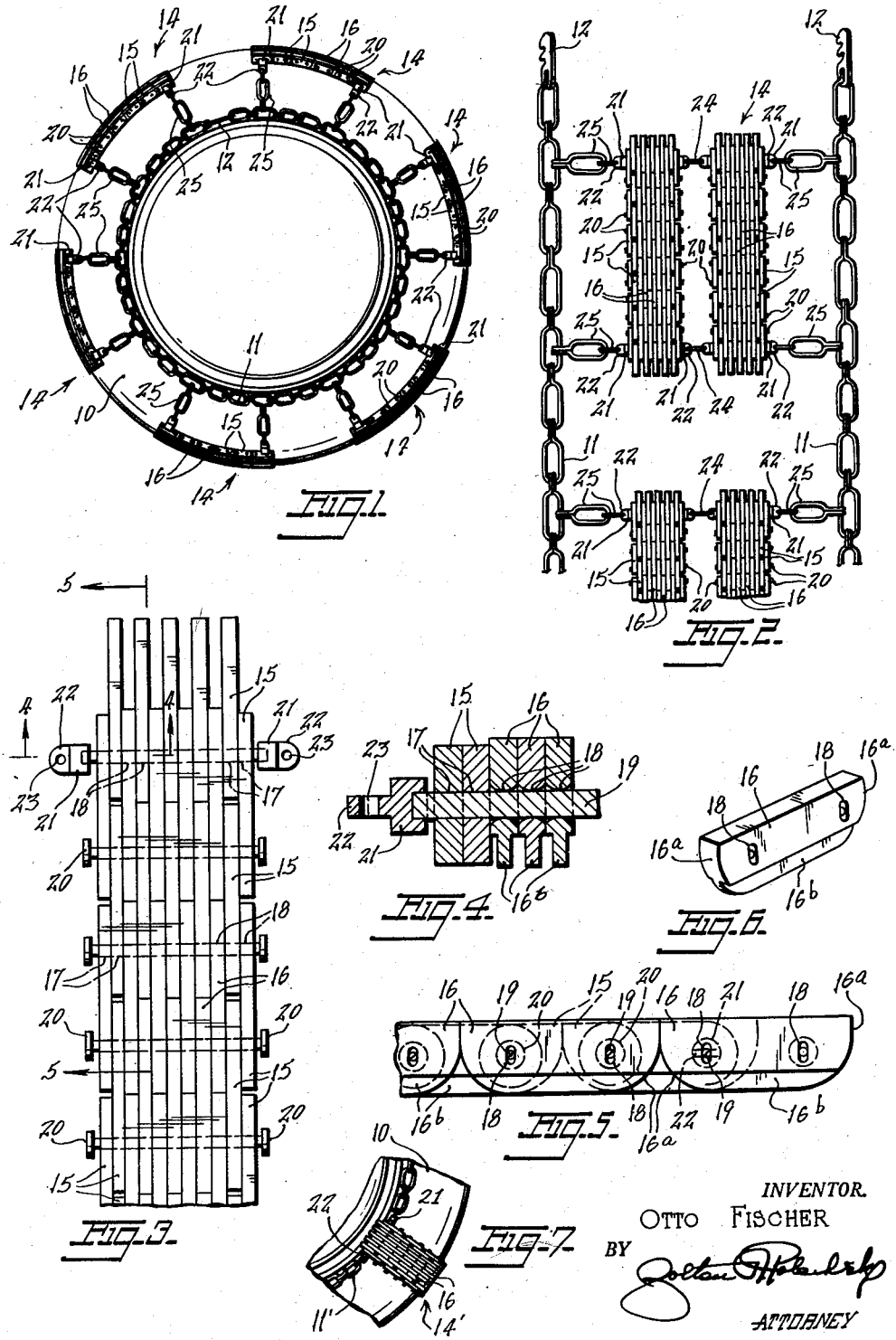
INVENTOR.
Otto Fischer

United States Patent Office 2,702,575
Patented Feb. 22, 1955

2,702,575

FLEXIBLE SKID CHAIN

Otto Fischer, New York, N. Y.

Application February 15, 1952, Serial No. 271,658

5 Claims. (Cl. 152—239)

This invention relates to new and useful improvements in anti-skid chains for the pneumatic tires of automobiles, trucks, busses and other motor vehicles.

More specifically, the present invention proposes the construction of an anti-skid chain characterized by elongated parallel chains of a length to form complete circles along the opposed sides of the tread of a pneumatic tire and between which flat flexible laterally spaced tread members are supported in a manner to rest on the tread of a tire and present flat surfaces for gripping the surface of snow and ice to prevent skidding.

Still further, the present invention proposes novel means for mounting the laterally spaced pairs of tread members in position between the elongated chains in a manner so that the tread members of each pair will be free for relative movement to adjust themselves to the road surface without undue pressures on the elongated chains between which the tread members are connected.

As a further object, the present invention proposes constructing the tread members of a plurality of end aligned plates arranged in adjacent rows and connected together by transversely extended flexible stranded steel cables in a manner so that the plates of each tread member will be free for pivotal movement conforming the tread members to the peripheral curvature of the tread of the tire and so that the plates of each tread member will be free for slight relative lateral movement to adjust themselves to the lateral curvature of the tread of the tire and to assume flat or other curved positions as the tread members pass between the road surface and the tire during rotation of the wheel.

Another object of the present invention proposes constructing an anti-skid chain having tread members which will be effective to prevent transverse as well as longitudinal slipping of the vehicle upon which the chains are mounted.

It is a further object of the present invention to construct anti-skid chains of the type disclosed which are simple and durable, which are effective for their intended purposes and which can be manufactured and sold at a reasonable cost.

For further comprehension of the invention, and of the objects and advantages thereof, reference will be had to the following description and accompanying drawing, and to the appended claims in which the various novel features of the invention are more particularly set forth.

On the accompanying drawing forming a material part of the present disclosure:

Fig. 1 is a side elevational view of a pneumatic vehicle tire mounting an anti-skid chain constructed in accordance with the present invention—the normal tread of the tire has been omitted for clarity of illustration of the chain.

Fig. 2 is an enlarged plan view of one end of the anti-skid chain.

Fig. 3 is an enlarged detailed view of the end portion of one of the tread members, per se.

Fig. 4 is an enlarged partial transverse sectional view taken on the line 4—4 of Fig 3.

Fig. 5 is an enlarged partial longitudinal sectional view taken on the line 5—5 of Fig. 3.

Fig. 6 is a perspective view of one of the intermediate plates of the tread member, per se.

Fig. 7 is a view similar to a portion of Fig. 1, but showing the skid chain constructed in accordance with a modification of the present invention.

The anti-skid chain, according to the first form of the present invention shown in Figs. 1 to 6, is to be mounted about the outer periphery of any conventional pneumatic vehicle tire 10, as shown in Fig. 1. On that figure, the usual peripheral tread of the tire has been omitted for the sake of more clearly showing the constructional details of the chain. The tread of the tire may, of course, be of any design without in any way effecting the normal operation of the chain.

The chain is constructed to include a pair of parallel side chains 11 each of a length to form a complete circle, as shown in Fig. 1. The chains 11 are provided for location inwardly of the sides of the tread of the tire 10; with one chain at each side of the tire. Each of the chains 11 is made of a number of end aligned interconnected links and the endmost link of each chain, at one end thereof, is provided with a hook member 12. Each hook member 12 is provided for engagement with the link at the other end of the respective chain to releasably join the ends of the chains as shown in Fig. 1. Other types of clasps or the like can be used for releasably joining the ends of the chains without departing from the scope and intent of the present invention.

Laterally spaced pairs of tread members 14 are positioned between the chains 11 to rest on the surface of the tread of the tire 10, again as shown in Fig. 1. Each of the tread members 14 is alike in construction and each includes at the sides thereof two parallel rows of end aligned outer plates 15 and between those two rows of outer plates a plurality of rows of end aligned intermediate plates 16. The plates 15 and 16 are all elongated in a direction parallel to the length of the chains 11 with the plates of each row staggered with relation to the plates of the next adjacent rows. As best shown in Figs. 3 and 5, the outer plates 15 are slightly shorter than the intermediate plates 16 and those outer plates 15 have concentric rounded ends. The intermediate plates 16 of each row have their ends abutting one another with their corners 16ᵃ which face the tread of the tire 10 cut away to be rounded, as best shown in Figs. 5 and 6. The outer corners of the intermediate plates 16 are left square to abut one another, when the plates are all in the same plane, as shown in Fig. 5.

The overlapped ends of the outer plates 15 are formed with aligned holes 17, see Fig. 4. The overlapped ends of the intermediate plates 16 are formed with aligned holes 18 aligned with the holes 17 of the outer plates 15. Extended through the aligned holes 17 and 18 there are flexible stranded steel cables 19 for joining all of the plates 15 and 16 of each of the tread members. The cables 19 permit relative pivotal movement of the plates 15 and 16 about the longitudinal axes of the cables; however, the abutting square outer corners of the intermediate plates 16 permit such pivotal movement in a direction toward the tread of the tire only and away therefrom until such time as the square outer corners abut again as shown in Fig. 5. Thus, freedom of pivotal movement of the plates 15 and 16 in a direction away from the tread of the tire is restricted by the square abutting outer corners of the intermediate plates 16.

To permit lateral movement of the plates 15 and 16 with relation to each other and in a direction parallel to the axes of the cables 19, the holes 18 of the intermediate plates 16 have their ends flared outward at right angles to the lengths of those plates providing rounded surfaces, see Fig. 4, which engage opposed sides of the cables 19. The intermediate plates 16 inwardly of the holes 18 are formed with reduced portions 16ᵇ which bear against the tread of the tire. The reduced portions 16ᵇ are formed by undercutting the opposed faces of the intermediate plates 16. The reduced portions 16ᵇ act in concert with the flared ends of the holes 18 to permit freedom of lateral movement of the plates 16, as the cables 19 bend longitudinally to shape the tread members 14 laterally to the lateral curvature of the tread of the tire 10.

Each of the cables 19 is of a length somewhat greater than the transverse width of the tread member and have their ends projected beyond the outer faces of the outermost outer plates 15. Fixedly mounted on the ends of the cables 19, located between the endmost cables of each tread member, there are metallic collars 20. The collars 20 are welded in position on the ends of their cables 19 with the space between their inner faces slightly greater than the transverse width of the plates of the tread members so that those plates will have the desired freedom of relative transverse movement.

Means is provided for joining the tread members 14 of each pair and for connecting each pair of tread members in position between the chains 11. The joining means includes enlarged head members 21 welded in position on the ends of the cables 19 at the ends of each of the tread members. The head members 21 have their adjacent faces spaced the same distance as the collars 20 and for the same reason.

Extended from the outer faces of each of the head members of each of the endmost cables 19, there are transverse lugs 22 each having an aperture 23. The head members 21 of adjacent tread members 14 are joined by wire links 24, see Fig. 2. The outermost head members 21 of each of the tread members of each pair are joined to the respective chain 11 by means of pairs of links 25, see Figs. 1 and 2. One link of each pair of links 25 is passed through the aperture of the respective outermost head member 21 and the other link of each pair is engaged with one of the links of the respective chain 11.

The modification of the invention shown in Fig. 7 has the tread members 14' extended transversely of the normal tread of the tire 10. The head members 21 at the ends of the tread members 14' are connected directly to spaced links of the chains 11' extended along the sides of the tire 10.

In all other respects, the form of the invention shown in Fig. 7 is similar to that described in connection with Figs. 1 to 6 and like reference numerals are used to identify like parts.

From the foregoing description, it is apparent that the present invention proposes a novel anti-skid chain which when mounted on the tire will readily conform itself to the circumferential and transverse arcuate formations of the tire. The tread members 14 and 14' are free for movement relative to one another to conform themselves to irregularities in the road surface without placing undue strains on the chains 11 or 11'. At the same time, the plates 15 and 16 of the tread members 14 and 14' are free for limited relative movement so that the tread members can each conform themselves to the circumferential and transverse curvature of the tread of the tire. At the same time, when the tire 10 and chain are turning as a unit with the vehicle wheel, the tread members 14 and 14' will readjust their formation, as they pass beneath the wheel, to the surface of the road to effectively grip snow and ice and prevent longitudinal as well as transverse slipping of the vehicle mounting the skid chains.

While I have illustrated and described the preferred embodiments of my invention, it is to be understood that I do not limit myself to the precise constructions herein disclosed and the right is reversed to all changes and modifications coming within the scope of the invention as set forth in the appended claims.

Having thus described my invention, what I claim as new and desire to secure by United States Letters Patent is:

1. An anti-skid chain comprising a pair of parallel side chains of a length to form complete circles along opposite sides of the tread of a pneumatic vehicle tire, means releasably securing together the ends of said chains, laterally spaced pairs of tread members positioned between said chains to rest on the tread of the tire, and means connecting said tread members to said chains, said tread members comprising outer rows of end aligned outer plates, a plurality of rows of end aligned intermediate plates between said outer rows of outer plates, said plates of each row being staggered with relation to the plates of the next adjacent rows causing the ends of the plates of adjacent rows to be overlapped, said overlapped ends of said plates having aligned holes, and flexible stranded wire cables passed through said aligned holes, said plates being elongated parallel to the length of said side chains, said outer plates being shorter than said intermediate plates and having ends rounded concentric with said cables, said intermediate plates having square outer corners abutting one another restraining pivotal movement of said plates in a direction away from the tire and having rounded inner corners permitting relative pivotal movement of said plates in a direction toward the tire.

2. An anti-skid chain comprising a pair of parallel side chains of a length to form complete circles along opposite sides of the tread of a pneumatic vehicle tire, means releasably securing together the ends of said chains, laterally spaced pairs of tread members positioned between said chains to rest on the tread of the tire, and means connecting said tread members to said chains, said tread members comprising outer rows of end aligned outer plates, a plurality of rows of end aligned intermediate plates between said outer rows, said plates of each row being staggered with relation to the plates of the next adjacent rows causing the ends of the plates of adjacent rows to be overlapped, said overlapped ends of said plates having aligned holes, and flexible stranded wire cables passed through said aligned holes, said connecting means comprising enlarged head members on the ends of the outermost cables of each of said tread members, outwardly extended lugs on the outer faces of said head members formed with apertures, links passed through the apertures of adjacent head members, and pairs of links connecting the outermost head members of each pair of tread members to said side chains.

3. An anti-skid chain comprising a pair of parallel side chains of a length to form complete circles along opposite sides of the tread of a pneumatic vehicle tire, means releasably securing together the ends of said chains, laterally spaced pairs of tread members positioned between said chains to rest on the tread of the tire, and means connecting said tread members to said chains, said tread members comprising outer rows of end aligned outer plates, a plurality of rows of end aligned intermediate plates between said outer rows, said plates of each row being staggered with relation to the plates of the next adjacent rows causing the ends of the plates of adjacent rows to be overlapped, said overlapped ends of said plates having aligned holes, and flexible stranded wire cables passed through said aligned holes, said connecting means comprising enlarged head members on the ends of the outermost cables of each of said tread members, outwardly extended lugs on the outer faces of said head members formed with apertures, links passed through the apertures of adjacent head members, and pairs of links connecting the outermost head members of each pair of tread members to said side chains, and collars mounted on the ends of the cables of each of said tread members between said outermost cables.

4. An anti-skid chain comprising a pair of parallel side chains of a length to form complete circles along opposite sides of the tread of a pneumatic vehicle tire, means releasably securing together the ends of said chains, laterally spaced pairs of tread members positioned between said chains to rest on the tread of the tire, and means connecting said tread members to said chains, said tread members comprising outer rows of end aligned outer plates, a plurality of rows of end aligned intermediate plates between said outer rows, said plates of each row being staggered with relation to the plates of the next adjacent rows causing the ends of the plates of adjacent rows to be overlapped, said overlapped ends of said plates having aligned holes, and flexible stranded wire cables passed through said aligned holes, said connecting means comprising enlarged head members on the ends of the outermost cables of each of said tread members, outwardly extended lugs on the outer faces of said head members formed with apertures, links passed through the apertures of adjacent head members, and pairs of links connecting the outermost head members of each pair of tread members to said side chains, and collars mounted on the ends of the cables of each of said tread members between said outermost cables, said head members and collars of each of said cables having their adjacent faces spaced a distance greater than the transverse width of said tread members.

5. An anti-skid chain comprising a pair of parallel side chains of a length to form complete circles along opposite sides of the tread of a pneumatic vehicle tire, means releasably securing together the ends of said chains, laterally spaced pairs of tread members positioned between said chains to rest on the tread of the tire, said tread members including outer rows of end aligned outer plates and a plurality of rows of end aligned intermediate plates between said outer rows, said outer and intermediate plates having aligned holes therethrough, cables extending through said holes for connecting said plates, the holes of said intermediate plates being flared outwardly in a direction extending at right angles to the length of said intermediate plates thereby forming rounded surfaces bearing against said cables on opposite sides thereof, said intermediate plates inward of said flared holes having their opposed faces undercut forming reduced portions for engaging the tread of the tire.

References Cited in the file of this patent

UNITED STATES PATENTS

| | | |
|---|---|---|
| 807,611 | Fairburn | Dec. 19, 1905 |
| 927,447 | Belyea | July 6, 1909 |
| 1,043,402 | Crowe | Nov. 5, 1912 |
| 1,075,993 | Savage | Oct. 14, 1913 |
| 1,339,800 | Walkup | May 11, 1920 |
| 1,458,107 | Sincell | June 5, 1923 |
| 1,517,875 | Van Ronzelen | Dec. 2, 1924 |
| 1,539,615 | Wildman | May 26, 1925 |
| 1,553,620 | Kerkling et al. | Sept. 15, 1925 |
| 1,995,112 | Belcher | Mar. 19, 1935 |
| 2,441,429 | Masure | May 11, 1948 |

FOREIGN PATENTS

| | | |
|---|---|---|
| 443,511 | France | July 17, 1912 |